United States Patent
Gates et al.

(10) Patent No.: US 9,004,048 B2
(45) Date of Patent: Apr. 14, 2015

(54) GAS BACKPRESSURE SENSOR ASSEMBLY

(75) Inventors: Freeman C. Gates, Bloomfield Hills, MI (US); Fadi M. Naddaf, Macomb Township, MI (US); William R. Goodwin, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 421 days.

(21) Appl. No.: 13/544,131

(22) Filed: Jul. 9, 2012

(65) Prior Publication Data

US 2014/0007850 A1   Jan. 9, 2014

(51) Int. Cl.
   *G01M 15/10*   (2006.01)
   *F02M 25/07*   (2006.01)

(52) U.S. Cl.
   CPC ............... *F02M 25/07* (2013.01); *G01M 15/10* (2013.01); *Y02T 10/121* (2013.01)

(58) Field of Classification Search
   CPC ..... F02M 25/07; G01M 15/10; G01M 15/106
   See application file for complete search history.

(56) References Cited

U.S. PATENT DOCUMENTS

| | | | |
|---|---|---|---|
| 4,164,206 A | | 8/1979 | Toelle |
| 5,459,351 A | * | 10/1995 | Bender ..................... 257/417 |
| 6,301,887 B1 | | 10/2001 | Gorel et al. |
| 6,434,474 B1 | * | 8/2002 | Kotwicki et al. ........... 701/108 |
| 7,077,008 B2 | * | 7/2006 | Pham et al. .................. 73/716 |
| 2008/0105057 A1 | | 5/2008 | Wade |
| 2009/0151464 A1 | | 6/2009 | Ricks |

* cited by examiner

*Primary Examiner* — Stephen K Cronin
*Assistant Examiner* — Xiao Mo
(74) *Attorney, Agent, or Firm* — James Dottavio; MacMillan, Sobanski & Todd, LLC

(57) ABSTRACT

A gas sensor assembly for sensing a pressure of a gas including a housing, a carrier, an electronic chip, a cap and a biasing apparatus. The housing has a wall defining cavity with a port open to the gas. The carrier is mounted to the wall in the cavity. The electronic chip is secured to the carrier on an opposed side from the port and includes a diaphragm portion exposed to the port. The cap is mounted to the chip on an opposed side from the carrier. The biasing apparatus is located between the cap and the wall of the housing, with the biasing apparatus being configured to bias the cap toward the chip whereby gas pressure acting against the diaphragm is opposed by the biasing apparatus.

20 Claims, 3 Drawing Sheets

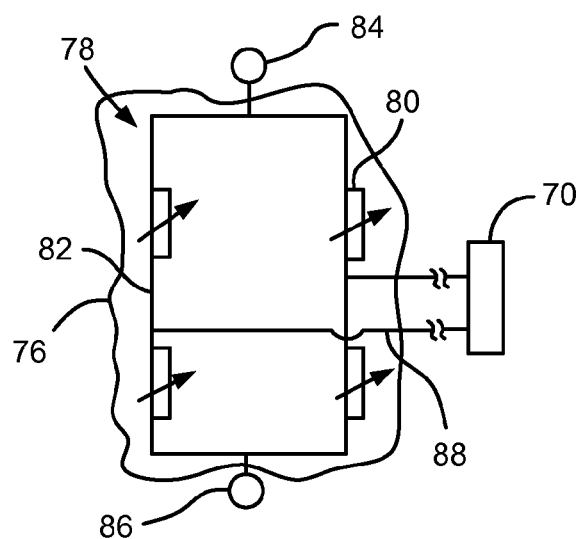
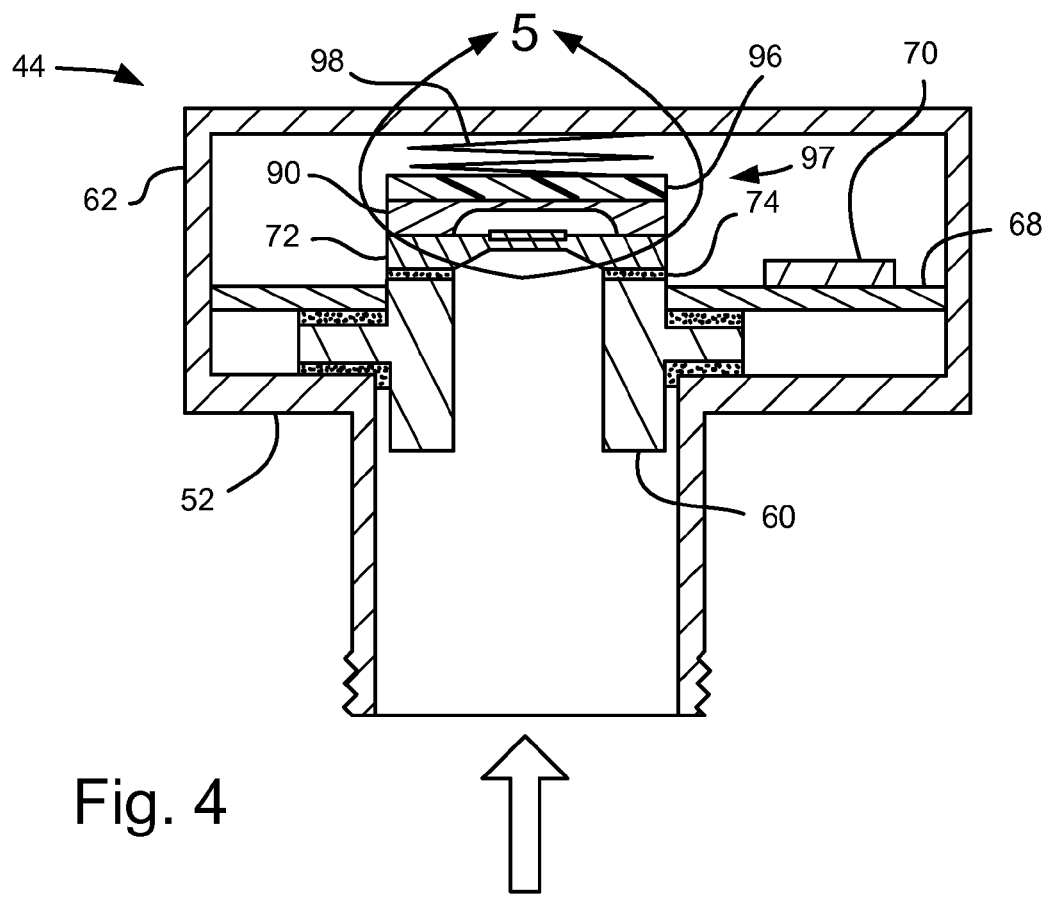

GAS BACKPRESSURE SENSOR ASSEMBLY

BACKGROUND OF INVENTION

The present invention relates to a pressure sensor assembly for sensing gas pressure, and may be more particularly applicable to a sensor assembly for sensing exhaust gas recirculation (EGR) backpressure.

For certain systems that employ gas to function, it is important to accurately measure the gas pressure at a particular point in the system. In such systems, then, a sensor is employed that measures the gas pressure. Such systems may be employed in such technology areas as automotive, industrial, aerospace and process controls.

For example, some turbocharged, direct injected engines equipped with variable cam technology have demonstrated considerable improvement in fuel economy by the addition of cooled external exhaust gas recirculation (EGR). The exhaust gas can be drawn from the exhaust stream either post turbine for a low pressure EGR application or pre-turbine for a high pressure EGR application. With a high pressure EGR application, in order to assure sufficient accuracy of an EGR mass flow estimation through an EGR valve to an intake manifold having an active wastegate system, it is important to accurately detect the absolute backpressure in the EGR gas.

One current methodology employed on high pressure diesel engine EGR applications uses a ceramic capacitive technology. This type of sensing mechanism produces an increase in capacitance proportional to a corresponding increase in EGR gas pressure. Signal conditioning electronics then provide voltage output values that vary according to variations in pressure to an electronic control module. The electronic control module then uses this EGR pressure information in its engine control strategy. While EGR gas measurements are obtained using this method, it has drawbacks. First, this sensor technology may be too bulky for an EGR valve sensor assembly—that is, the assembly may not package appropriately in particular vehicles. Second, this type of pressure sensor assembly may be more expensive than is desirable for use in particular vehicle and other types of systems.

Another methodology employs a silicon piezoresistive Wheatstone bridge pressure sensing technology. This methodology reduces the packaging size and cost versus ceramic capacitive technology. However, with this silicon technology, the sensor mount may be subject to adhesive bond joint fatigue/failure resulting from the relatively high exhaust gas backpressure combined with exhaust pulsating pressure amplitude. Adhesives securing silicon piezoresistive sense elements do not generally provide a reliable long term bond, especially for gas pressures above two bar absolute and 125 degrees Celsius, and when combined with pressure pulsations inherent with exhaust gas pressures from an internal combustion engine.

SUMMARY OF INVENTION

An embodiment contemplates a gas sensor assembly for sensing a pressure of a gas including a housing, a carrier, an electronic chip, a cap and a biasing apparatus. The housing has a wall defining cavity with a port open to the gas. The carrier is mounted to the wall in the cavity. The electronic chip is secured to the carrier on an opposed side from the port and includes a diaphragm portion exposed to the port. The cap is mounted to the chip on an opposed side from the carrier. The biasing apparatus is located between the cap and the wall of the housing, with the biasing apparatus being configured to bias the cap toward the chip whereby gas pressure acting against the diaphragm is opposed by the biasing apparatus.

An embodiment contemplates an exhaust gas recirculation system for an engine including an EGR tube and an EGR module. The EGR tube receives an exhaust gas from the engine. The EGR module has an EGR valve that receives the exhaust gas from the EGR tube and an exhaust backpressure sensor assembly. The exhaust backpressure sensor assembly includes a housing having a wall defining a cavity with a port open to the EGR tube, a carrier mounted to the wall, an electronic chip secured to the carrier on an opposed side from the port and including a diaphragm portion exposed to the port, a cap mounted on the chip on an opposed side from the carrier, and a biasing apparatus mounted on the cap on an opposed side from the chip and biasing the cap against the chip in a direction opposite from exhaust gas pressure on the diaphragm.

An advantage of an embodiment is that the pressure sensing element is relatively small and low cost while still being able to withstand relatively high pressure, such as, for example, high pressure exhaust gas from an internal combustion engine. This gas pressure sensing assembly may be applied not only in automotive exhaust pressure measurements, but also in industrial, aeronautical and process control applications for measuring relatively high gas pressures.

BRIEF DESCRIPTION OF DRAWINGS

FIG. 3 is a schematic view of a portion of an electronic assembly that may be used in the EGR backpressure assembly.

FIG. 4 is a schematic view similar to FIG. 2, but illustrating a modification of the assembly.

DETAILED DESCRIPTION

Figure 1:
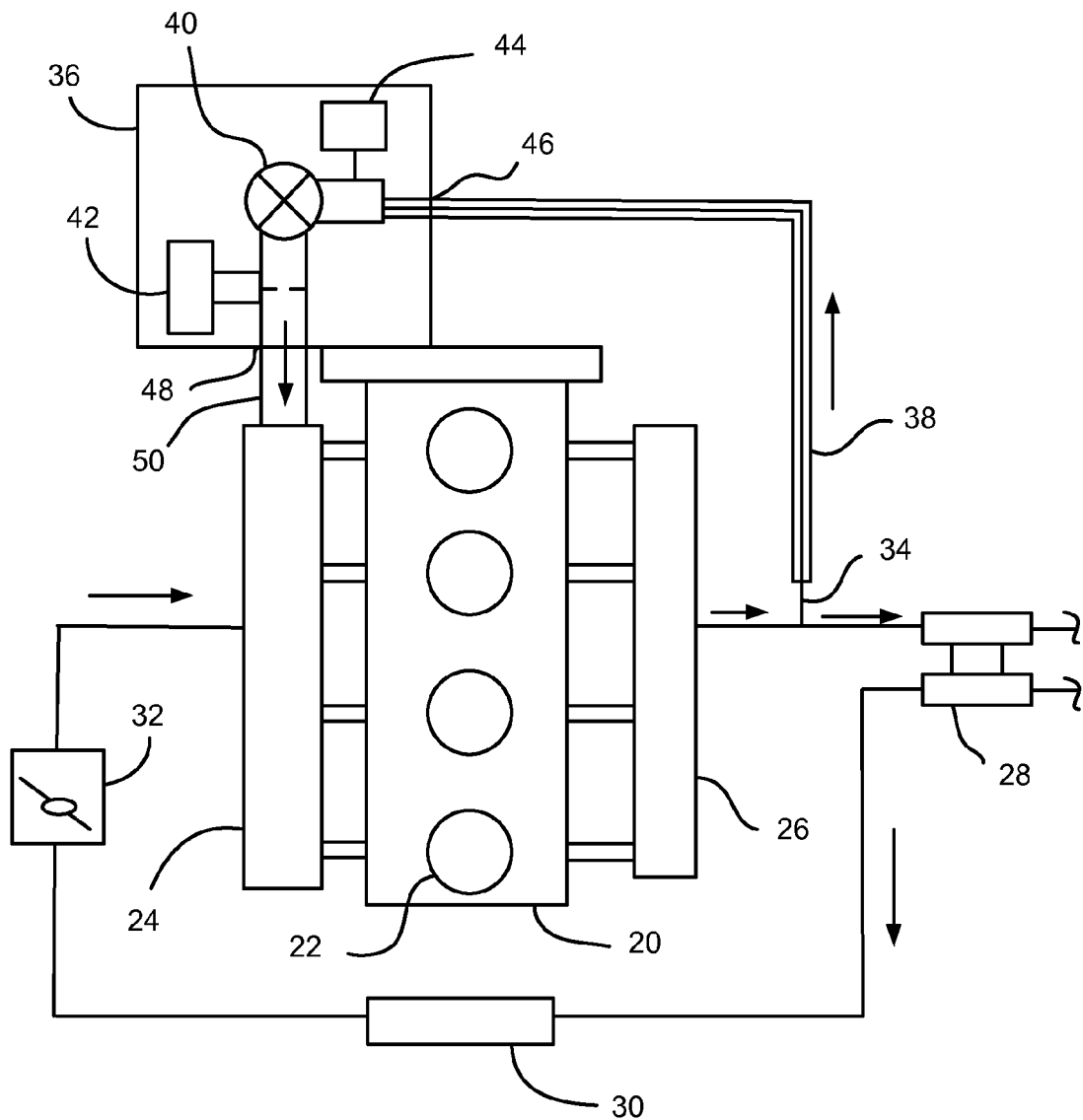
FIG. 1 is a schematic diagram of an engine system that may be employed in a vehicle.

FIG. 1 shows an internal combustion engine 20 having four cylinders 22, with the cylinders 22 in fluid communication with an intake manifold 24, for receiving intake air, and an exhaust manifold 26 into which exhaust gasses are discharged. The intake air may pass through a turbocharger 28, where it is compressed, through a charge air cooling assembly 30, where the pressurized air is cooled, and through a throttle 32, where the flow of the air is controlled, before passing into the intake manifold 24. After being mixed with a fuel and burned in the cylinders 22, the exhaust gas is expelled into the exhaust manifold 26. From the exhaust manifold 26, a portion of the exhaust gas is sent through the turbocharger 28 to pressurize the intake air. A portion of the exhaust gas is also bled into an exhaust gas recirculation (EGR) tube 34, which directs the EGR gas to an EGR module 36. The EGR tube 34 may have a water cooling assembly 38 interacting with a portion of the tube 34 where water is used to cool the EGR gases before they reach the EGR module 36. The arrows in FIG. 1 indicate the direction of flow of gasses through the system.

The EGR module 36 may include an EGR valve 40, for controlling the flow of recirculated exhaust gas into the intake manifold 24, a second sensor 42, and an exhaust backpressure sensor assembly 44, for sensing the pressure in the EGR gas. An inlet 46 to the EGR module 36 receives gas from the EGR tube 34 and directs gas flow past the sensor assembly 44 to the EGR valve 40. An outlet 48 from the EGR module 36 directs the gas past the second sensor 42 and into a tube 50 leading to the intake manifold 24.

Figure 2:
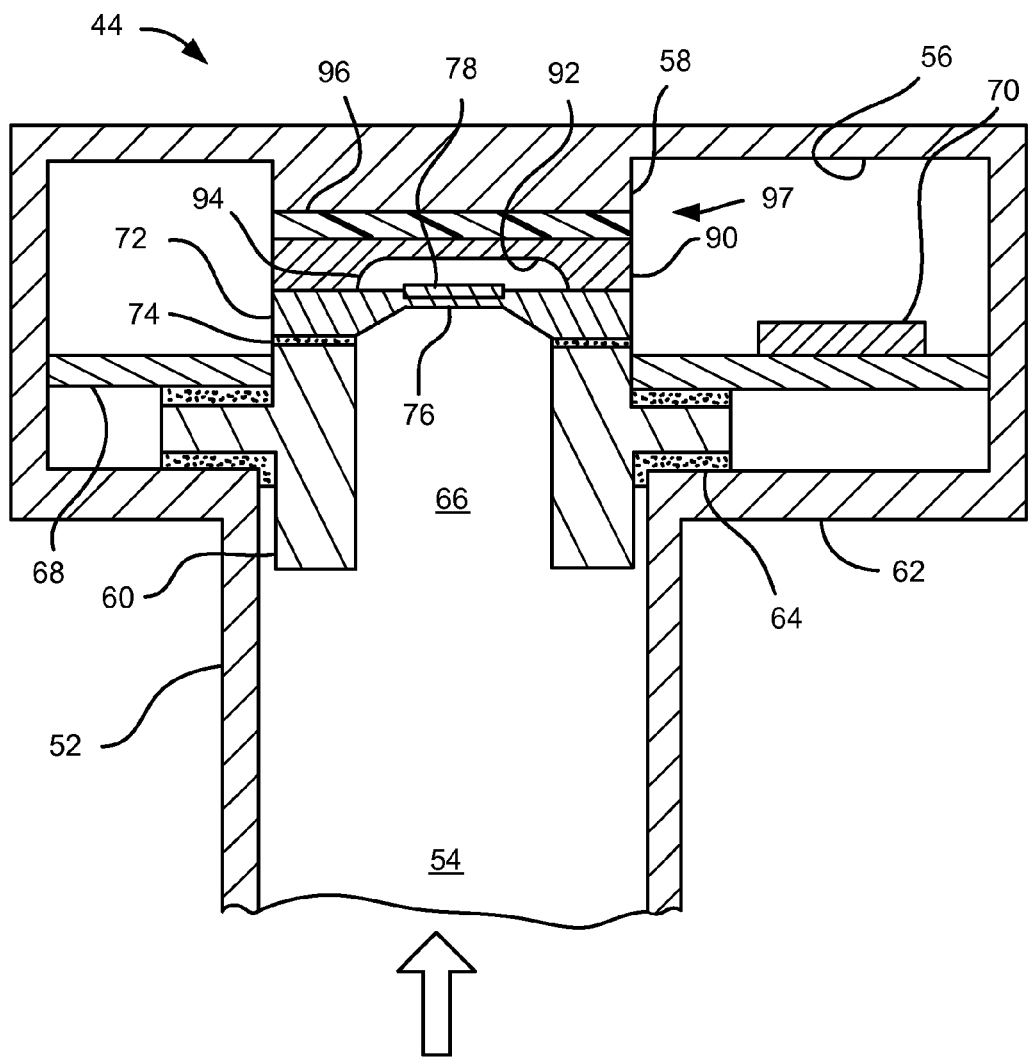
FIG. 2 is a schematic, cross-sectional view of an EGR backpressure sensor assembly.

FIG. 2 schematically illustrates the exhaust backpressure sensor assembly 44 in more detail. The assembly 44 includes a housing 52 having a gas port 54 for receiving the pressurized gas, a cavity 56 within which sensor components are mounted, and a bumper support 58 located opposite to and facing the gas port 54. The large arrow in FIGS. 2 and 4 indicate the gas pressure acting through the port 54. A carrier 60 is mounted in the cavity 56 to the housing wall 62 and includes a bore 66 generally co-axial with the gas port 54. The carrier 60 may be secured to the wall in various ways, including, for example, with an adhesive 64. A printed circuit board 68 may be mounted on the carrier 60 and include various electronic leads and circuitry, including, for example, sensor processing electronics 70.

Also, a micromachined silicon chip 72 may be secured to the carrier 60 on an end of the carrier 60 opposite to the port 54 by an adhesive 74. The chip 72 is secured over the top of the bore 66 so that a diaphragm portion 76 of the chip 72 extends over the bore 66, thus being exposed to the gas pressure of the port 54. The diaphragm portion 76 includes a piezoresistive Wheatstone bridge 78.

FIG. 3 illustrates an example of how the Wheatstone bridge 78 of the diaphragm portion 76 may be configured. The Wheatstone bridge 78 may include four piezoresistors 80 connected by conductive traces 82, with wire bonds for a positive voltage 84, a negative voltage 86 and electrical connections 88 to the sensor processing electronics 70 on the printed circuit board. The output from the Wheatstone bridge 78 to the sensor processing electronics varies as the pressure in the gas varies.

Returning to FIG. 2, a cap 90 is mounted on the chip 72, and may be made of glass and attached to the chip 72 by an anodic bond. The cap 90 includes a cap cutout 92 forming a chamber 94 around the area of the Wheatstone bridge 78. An elastomeric bumper 96 is wedged between the cap 90 and the bumper support 58 of the housing 52. The bumper 96 may be made of rubber or an elastomeric type of polymer. The elastomeric bumper 96 and the bumper support 58 create a biasing apparatus 97 that biases the cap 90 toward the chip 72. If the housing 52, for example, is formed with a smaller cavity 56 (without the bumper support 58) so that the elastomeric bumper 96 is sandwiched between the housing wall 62 and cap 90, then the elastomeric bumper 96 itself if the biasing apparatus 97.

The operation of the exhaust backpressure sensor assembly 44 will be discussed relative to FIGS. 1-3. While the engine 20 is operating, exhaust is produced and directed through the exhaust manifold 26 and flows toward the turbocharger 28. A portion of this exhaust gas, before reaching the turbocharger 28, is bled off into the EGR tube 34. Being bled off before the turbocharged 28, the gas fed into the EGR tube 34 is considered to be under high pressure. As the exhaust gas flows through the EGR tube 34, it may be cooled by the water cooling assembly 38 (if this assembly is employed with this engine configuration).

The exhaust gas then flows past the gas port 54 of the sensor assembly 44 as it flows toward the EGR valve 40. The pressure of the gas, then, is felt in the gas port 54 and bore 66, and, accordingly, against the diaphragm portion 76 of the chip 72. This pressure may be, for example, around four bar (sixty pounds per square inch). As the gas pressure acts on the diaphragm portion 76, the Wheatstone bridge 78 outputs and electric signal that varies according to the variation in gas pressure. This signal is transmitted to the sensor processing electronics 70, where it may be utilized in the engine control strategy. Also, as the gas pressure pushes against the diaphragm portion 76, this creates a force that tends toward pushing the chip 72 away from the carrier 60. However, as this force is applied, the chip 72 presses against the cap 90, which, in turn, presses against the bumper 96 (part of the biasing apparatus 97). The bumper 96, is supported by the bumper support 58 of the housing 52. Thus, the elastomeric properties of the bumper 96 cause the elements to resist this force created by the gas pressure. By resisting the force, the stresses and strains on the adhesive 74 between the carrier 60 and chip 72 are substantially reduced. This reduction in the stresses and strains on the adhesive 74 reduces the possibility of fatigue failure (or other type of failure) of the adhesive 74 over the life of the EGR module 36.

FIG. 4 shows the exhaust backpressure assembly 44 with a modification. The carrier 60, circuit board 68, chip 72, electronics 70 and cap 90 may be the same as in the first embodiment. In this embodiment, the housing 52 is changed. Instead of (or optionally in addition to) a bumper support, a spring 98 is mounted between the housing wall 62 and the bumper 96. The spring 98 biases the bumper 96 into contact with the cap 90. The spring 98 and bumper 96 now form the biasing apparatus 97. This arrangement acts similar to the first embodiment in that the forces tending to push the chip 72 away from the carrier 60 are opposed by the spring 98 and bumper 96 to minimize the stresses and strains on the adhesive 74.

Figure 5:
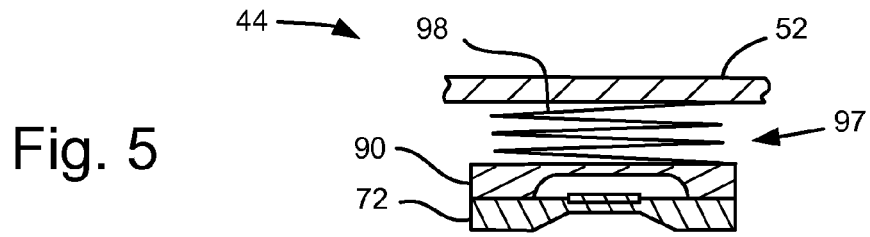
FIG. 5 is a schematic view of a portion of FIG. 4, taken from encircled area 5, but illustrating another embodiment.

FIG. 5 shows a portion of the exhaust backpressure assembly 44 with a modification. The chip 72, cap 90 and housing 52 may be the same as in FIG. 4, but the elastomeric bumper is replaced with a longer spring 98 to fill the gap between the housing 52 and the cap 90. The spring 98 now forms the biasing apparatus 97.

In addition, while the exhaust backpressure sensor assembly has been described relative to an exhaust gas recirculation system for an engine, this sensor assembly may be used in other technical fields where the measurement of a gas pressure is desired.

While certain embodiments of the present invention have been described in detail, those familiar with the art to which this invention relates will recognize various alternative designs and embodiments for practicing the invention as defined by the following claims.

What is claimed is:

1. A gas sensor assembly for sensing a pressure of a gas comprising:
    a housing having a wall defining cavity with a port open to the gas;
    a carrier mounted to the wall in the cavity;
    an electronic chip secured to the carrier on an opposed side from the port and including a diaphragm portion exposed to the port;
    a cap mounted to the chip on an opposed side from the carrier; and
    a biasing apparatus located between the cap and the wall of the housing, the biasing apparatus configured to bias the cap toward the chip and the chip toward the carrier.

2. The assembly of claim 1 wherein the biasing apparatus is a bumper wedged between the cap and the wall of the housing, the bumper being made of an elastomeric material.

3. The assembly of claim 2 wherein the wall of the housing includes a bumper support extending into the cavity and configured to press against the bumper to maintain the bumper in surface engagement with the cap.

4. The assembly of claim 2 including a spring compressed between the wall of the housing and the bumper and configured to bias the bumper toward the cap.

5. The assembly of claim 2 wherein the bumper is made of rubber.

6. The assembly of claim 1 wherein the chip is secured to the carrier with adhesive.

7. The assembly of claim 1 wherein the carrier is rigidly secured to the wall.

8. The assembly of claim 1 wherein the biasing apparatus is a spring compressed between the wall of the housing and the cap and configured to bias the cap toward the chip.

9. The assembly of claim 1 wherein the electronic chip is supported by the carrier through an adhesive fixing the chip to the carrier.

10. The assembly of claim 1 including a circuit board mounted in the cavity, and sensor electronics mounted on the circuit board in the cavity, with the sensor electronics electrically connected to the chip.

11. An exhaust gas recirculation system for an engine comprising:
    an EGR tube configured to receive an exhaust gas from the engine; and
    an EGR module having an EGR valve configured to receive the exhaust gas from the EGR tube and an exhaust backpressure sensor assembly;
    wherein the exhaust backpressure sensor assembly includes a housing having a wall defining a cavity with a port open to the EGR tube, a carrier rigidly secured to the wall, an electronic chip secured to and rigidly supported by the carrier on an opposed side from the port and including a diaphragm portion exposed to the port, a cap mounted on the chip on an opposed side from the carrier, and a biasing apparatus mounted on the cap on an opposed side from the chip and configured to bias the cap against the chip in a direction opposite from exhaust gas pressure on the diaphragm.

12. The system of claim 11 wherein the biasing apparatus biasing the cap against the chip also biases the chip toward the carrier.

13. The system of claim 11 including a water cooling assembly engaging the EGR tube and configured to cool the exhaust gas flowing through the EGR tube.

14. The system of claim 11 wherein the chip is secured to the carrier with an adhesive.

15. The system of claim 11 wherein the exhaust backpressure sensor assembly is upstream of the EGR valve in the EGR module.

16. The system of claim 15 wherein the chip includes a piezoresistive Wheatstone bridge in the diaphragm portion and the cap cutout is located adjacent to the piezoresistive Wheatstone bridge.

17. The system of claim 11 wherein the biasing apparatus includes an elastomeric bumper mounted on the cap and a spring compressed between the wall of the housing and the bumper and configured to bias the bumper toward the cap.

18. The system of claim 11 wherein the biasing apparatus includes an elastomeric bumper wedged between the cap and the wall of the housing.

19. The system of claim 11 wherein the biasing apparatus includes an elastomeric bumper and the wall of the housing has a bumper support extending into the cavity and configured to press against the bumper to maintain the bumper in surface engagement with the cap.

20. A gas sensor assembly comprising:
    a housing wall defining a cavity with a port open to a gas;
    a carrier mounted to the wall;
    an electronic chip fixed to the carrier on an opposed side from the port and including a diaphragm portion;
    a cap mounted to the chip opposite the carrier;
    a biaser, located between the cap and the wall, biasing the cap toward the chip and the chip toward the carrier.

* * * * *